United States Patent [19]

Ball

[11] Patent Number: 4,830,229

[45] Date of Patent: May 16, 1989

[54] PUMP CHAMBER DISPENSER

[75] Inventor: Martin F. Ball, Wantage, England

[73] Assignee: Metal Box p.l.c., Reading, England

[21] Appl. No.: 73,747

[22] Filed: Jul. 15, 1987

[30] Foreign Application Priority Data

Jul. 16, 1986 [GB] United Kingdom ................. 8617350

[51] Int. Cl.[4] ......................... B67D 5/42; G01F 11/00

[52] U.S. Cl. ..................................... 222/209; 222/383

[58] Field of Search ............... 222/207, 209, 212, 213, 222/215, 256, 257, 259, 383, 385, 386, 387, 341, 340, 494

[56] References Cited

U.S. PATENT DOCUMENTS

| | | | |
|---|---|---|---|
| 2,562,317 | 7/1951 | Krall | 222/207 |
| 3,088,636 | 5/1963 | Spatz | 222/213 |
| 3,255,935 | 6/1966 | Spatz | 222/340 |
| 3,268,123 | 8/1966 | Spatz | 222/400.5 |
| 3,361,305 | 1/1968 | Spatz | 222/207 |
| 3,486,663 | 12/1969 | Humphrey | 222/207 |
| 3,726,442 | 4/1973 | Davidson | 222/207 |
| 3,752,366 | 8/1973 | Lawrence | 222/207 |
| 3,768,705 | 10/1973 | Spatz | 222/213 |
| 3,820,689 | 6/1974 | Cocita | 222/207 |
| 3,870,200 | 3/1975 | Spatz | 222/386 X |
| 3,986,644 | 10/1976 | Grogan | 222/207 |
| 3,987,938 | 10/1976 | Cooprider et al. | 222/209 |
| 4,154,371 | 5/1979 | Kolaczinski | 222/386 X |
| 4,301,948 | 11/1981 | Czech | 222/341 |
| 4,394,939 | 7/1983 | Thor | 222/207 |
| 4,402,431 | 9/1983 | Wiegner | 222/207 |
| 4,413,759 | 11/1983 | Mettenbrink | 222/213 |
| 4,421,255 | 12/1983 | Czech | 222/387 |
| 4,437,584 | 3/1984 | Connors | 222/391 X |
| 4,437,591 | 3/1984 | von Schuckmann | 222/391 |
| 4,438,871 | 3/1984 | Eckert | 222/256 X |
| 4,442,958 | 4/1984 | Amos | 222/213 |
| 4,461,403 | 7/1984 | Prahs | 222/391 X |
| 4,474,313 | 10/1984 | Sieverding | 222/386 X |
| 4,479,592 | 10/1984 | Rusing | 222/391 X |
| 4,485,943 | 12/1984 | Czech | 222/380 X |
| 4,511,068 | 4/1985 | Bossina | 222/387 X |
| 4,533,069 | 8/1985 | Drobish | 222/209 X |
| 4,538,747 | 9/1985 | von Schuckmann | 222/387 X |
| 4,564,130 | 1/1986 | Eulenburg | 222/207 |
| 4,565,306 | 1/1986 | Nakanishi | 222/383 |
| 4,598,843 | 7/1986 | Foster | 222/387 X |
| 4,609,130 | 9/1986 | Katva | 222/207 |
| 4,629,097 | 12/1986 | Moore | 222/387 X |
| 4,640,442 | 2/1987 | Drobish | 222/209 |
| 4,657,161 | 4/1987 | Endo et al. | 222/256 |
| 4,696,415 | 9/1987 | Meshberg | 222/383 X |

FOREIGN PATENT DOCUMENTS 1495100 6/1976 United Kingdom .

*Primary Examiner*—Kevin P. Shaver
*Attorney, Agent, or Firm*—St. Onge Steward Johnston & Reens

[57] ABSTRACT

A pump chamber dispenser for toothpaste or other viscous or pasty product comprises a pump member (54) moulded from elastomeric material and having a domed central portion (56) and a bifurcated peripheral portion providing inner and outer skirts arranged to lie against respective surfaces of a projection (36) formed on the end wall (18) of the dispenser body (10), and to serve as inlet and exit valves controlling an inlet port (20) communicating the pump chamber (21) with the reservoir chamber (22), and an exit port communicating the pump chamber with a discharge nozzle (68). The nozzle is integral with a cover fixed to the body (10) and enclosing the pump member, the cover including a button (70) for acting on the pump member to operate the dispenser.

18 Claims, 2 Drawing Sheets

PUMP CHAMBER DISPENSER

This invention relates to dispensers for viscous or pasty products such as toothpaste, of the kind having a reduceable-volume reservoir for the product, and a variable-volume pump chamber including a pump member which is operable by the user to draw product from the reservoir and subsequently expel the induced product through a suitable spout or other outlet for dispensing. For brevity, such a dispenser will hereinafter be referred to as a "pump chamber dispenser" throughout the specification and claims.

The induction and expulsion of product to and from the pump chamber of a pump chamber dispenser is achieved by the pump member, by generation of a pressure differential in the pump chamber in relation to the ambient environment. For induction of product, the pressure in the pump chamber is depressed below atmospheric pressure, and the differential pressure thereby produced causes product to be drawn from the reservoir and into the pump chamber through an entry port of the pump chamber. Correspondingly, expulsion of product from the pump chamber is caused by a superatmospheric pressure generated in the pump chamber by the pump member, which forces product to leave the pump chamber via an exit port of the pump chamber. Usually the reduceable volume reservoir is formed by a cylindrical body part of the dispenser, and a follower piston which is received in the body part and caused by differential pressure to move along the body part as dispensing proceeds. In some proposals, however, the follower piston is replaced by a flexible bag which collapses as product is being dispensed.

A pump chamber dispenser for pasty substances is known from EP-A-No. 0144879, and shown in FIGS. 11–13 thereof is such a dispenser having a unitary body with a cylindrical part enclosing the reservoir, and an upper end part defining a discharge nozzle and mounting a unitary pumping member of elastomeric material which confines with the upper body part the variable volume pumping chamber. A recess with an axis inclined to the axis of the cylindrical body part is formed in the upper part, and the pumping member has a peripheral rim which is forced over an undercut collar provided on the upper body part around the recess. The pumping member has integral flaps for closing the inlet and outlet ports which consist of holes extending through the side walls of the recess and communicating the pumping chamber with the reservoir chamber and with the discharge nozzle, respectively. The pumping member is designed to be actuated directly by the finger of a person using the dispenser and includes a portion which is flexible and compressible to vary the volume of the pumping chamber.

The above-mentioned pump chamber dispenser suffers a number of drawbacks. The body with integral nozzle and pumping chamber recess including inlet and exit holes, all inclined to the main longitudinal axis, is complicated and correspondingly expensive and difficult to make, and the assembly of the pumping member on the body is complicated by the need for it to be applied in a non-axial direction and after orientation, and by the need for a tight secure fit between these parts.

The present invention aims at a pump chamber dispenser which is convenient and economic to manufacture, and is effective in operation.

According to the invention there is provided a pump chamber dispenser for viscous or pasty product comprising a body including a tubular side wall and an end wall panel integral with the side wall, a closed reservoir chamber within the body for receiving viscous or pasty product to be dispensed, the chamber being defined partly by said end wall panel and being reduceable in volume as product is discharged therefrom, and a unitary pumping member of elastomeric material mounted on the end wall panel outside of the reservoir chamber and confining with the end wall panel a variable volume pump chamber, the pumping member including integral inlet and exit valve elements for controlling respectively an inlet port for conducting product to the pumping chamber from the reservoir chamber and an exit port for conducting product from the pumping chamber to a discharge nozzle, wherein:

the end wall panel has a generally annular projection directed away from the reservoir chamber and extending around an axis substantially parallel to the longitudinal axis of the body;

the pumping member has a domed portion and inner and outer coaxial skirts extending from the edge of the domed portion and forming the inlet and exit valve elements, respectively, said skirts lying against radially inner and outer surfaces of said projection;

the inlet port extends through the said radially inner surface of the projection and is closable by the inner skirt;

a passage formed within the projection communicates the inlet port with the reservoir chamber;

a recess in the end wall panel extends across the projection and defines the exit port, the exit port being in communication with the pumping chamber and opening at the radially outer surface of the projection at a position to be closable by the outer skirt; and a cover member is attached to the body and defines said discharge nozzle, the cover member being arranged to enclose the pumping member and having a movable part for acting on the domed portion of the pumping member to reduce the volume of the pumping chamber for dispensing.

With a pump chamber dispenser embodying the invention the body can be easily produced, especially by injection moulding. The discharge nozzle is provided by a cover member engaged in an operative position with the body, preferably by a snap fit connection, after the pumping member has been positioned on the body. The cover member can also serve to maintain the pumping member in operative combination with the body so that a tight force fit between them is no longer necessary. The pumping member is easily located on the body by moving the two skirts down on to the projection in the axial direction. In a preferred construction the inner and outer skirts are peripherally continuous and the pumping member is rotationally symmetrical, providing further improvement by eliminating the need for the pumping member to be oriented angularly with respect to the body. Each of the skirts is preferably non-convergent towards its free edge, and in a particular embodiment the skirts are substantially parallel to the longitudinal axis of the body. The inlet and exit ports are readily formed when making the body, as can the passage which connects the inlet port with the reservoir chamber. In a preferred construction the passage is defined by a groove which is open to the reservoir chamber. The groove avoids a narrow duct which could constrict flow of the viscous product to the pumping chamber, and can assist in conducting product to the inlet port from different regions around the axis of the dispenser. Finally, it may be mentioned that by virtue of the cover member having a part, such as a hinged portion or button, which acts on the pumping member, during operation the dispenser may have a more positive feel than a dispenser in which the pumping member is deformed directly by the finger of a user. Furthermore, by including an actuating part for acting on the pumping member greater choice is available for selecting the particular manner of actuation, e.g. by push button, pivotting lever, deformable diaphragm, etc.

In order that the invention may be more fully understood, two embodiments thereof will now be described, by way of example, with reference to the accompanying drawings in which.

Figure 1:
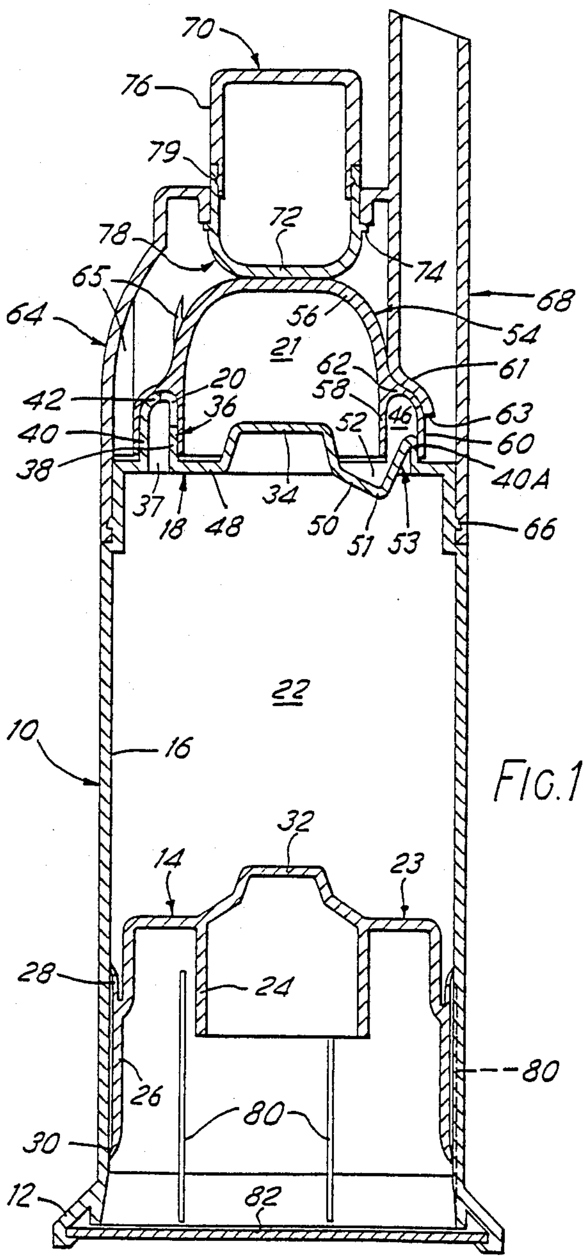
FIG. 1 shows a first pump chamber dispenser in accordance with the invention, as seen in central vertical section.

Referring now to FIG. 1 of the drawings, a pump chamber dispenser for toothpaste or like viscous or pasty product has an injection-moulded plastics body 10 arranged to stand upright on a flared standing rim 12 at its bottom end as shown. Above the rim the body is cylindrical and receives an injection-moulded plastics follower piston 14 which is slidable along its bore 16. The top end of the body is integrally closed by a contoured end wall or closure panel 18. The closure panel 18 is formed with an aperture 20 forming an inlet port for the pump chamber 21 of the dispenser as is later to be described. The body 10 and the follower piston 14 together form a reduceable-volume reservoir chamber in which the product is held and which is denoted generally by reference numeral 22.

The follower piston 14 comprises a central panel 23 formed on its underside with a stiffening collar 24 which also assists the initial insertion of the piston into the body after filling with product. For engaging the body bore 16 the piston has a flexible skirt 26 which is carried from the periphery of the central panel 23 and has leading and trailing feather edges 28, 30 which engage the bore 16 resiliently so as to prevent any leakage of air past the piston from outside when the pump chamber 21 is being recharged with product after a dispensing stroke. At its centre the panel 23 is formed with a boss 32 which is complementary to a corresponding boss 34 of the body closure panel 18 so as to minimise the amount of product residue left in the empty dispenser underneath the boss 34.

Figure 2:
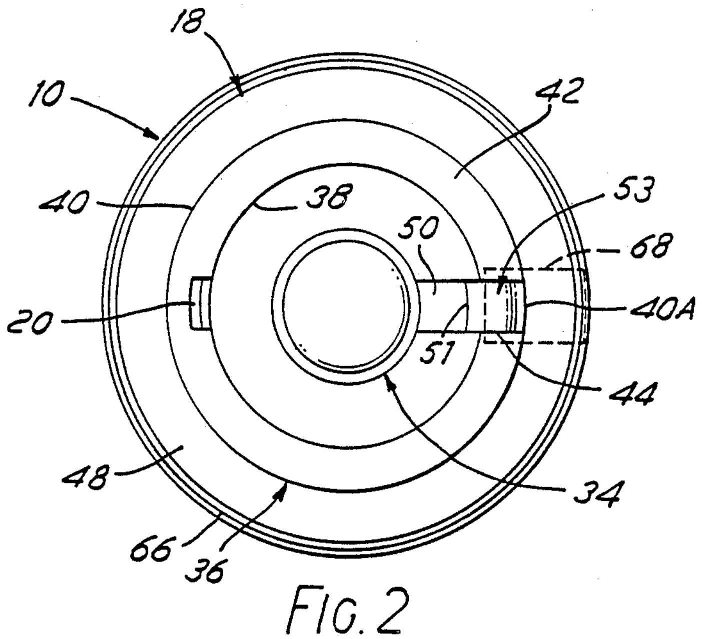
FIG. 2 is a plan view of the body of the dispenser of FIG. 1, showing detail of the closure panel.

As can best be seen in FIG. 2 which shows it in plan view from above, the body closure panel 18 includes, in addition to the upstanding central boss 34, a further, generally circular, upstanding projection 36 which extends concentrically around the boss 34. The projection 36 is hollow due to a groove 37 which is formed in the underside of the closure panel and is open to the product reservoir 22. The projection has inner and outer concentric cylindrical walls 38, 40, and a rounded top wall 42.

The previously mentioned aperture 20 is formed at the junction of the inner wall 38 and the rounded top wall 42, and is located in diametric opposition to a recess or discontinuity 44 of the projection 36 which extends through approximately 15° of arc and serves to define an outlet port, as will become clear.

The ends of the projection 36 at the discontinuity 44 are substantially closed by end walls 46, of which one is visible full-face in FIG. 1. The annular portion 48 of the closure panel 18 lying between the boss 34 and the projection 36 is plane except at the discontinuity 44; there, the closure panel is formed with a well 50 which extends, below the level of the annulus 48, from the boss 34 to outwardly beyond the circular locus of the inner wall 38. The well has a base angle 51, and side walls 52 (FIG. 1) which form plane continuations of the end walls 46 of the projection 36.

Outside the well the closure panel 18 rises above the level of the annulus 48 to form a shallow and radially narrow continuation 53 of the projection 36 between the end walls 46, including a shallow portion 40A of the outer wall 40. The continuation 53 thus forms a sill over which product can pass for dispensing as is later described.

Referring again to FIG. 1, the part of the closure panel 18 comprised of the annulus 48 and the boss 34 forms the base of the pump chamber 21 for the dispenser. The pump chamber is otherwise formed by a unitary pump member 54 which is moulded from a suitable elastomeric material such as silicon rubber and is rotationally symmetrical. As can clearly be seen in FIG. 1, the member 54 comprises a central dome 56 generally of hemispherical shape and overlying the annulus 48 and boss 34, and a bifurcated depending skirt formed of inner and outer peripherally continuous and radially spaced, equal length skirts 58, 60. In the interests of clarity the bifurcated skirt as such is not individually referenced. The skirts 58, 60 are integrally joined at their top edges by a rounded portion 62 of the pump member, which is moulded to conform in cross-section to the rounded top wall 42 of the projection 36.

The length of the skirts 58, 60 is slightly less than the height of the walls 38, 40 of the projection 36. The portion 62 of the pump member merges with the base of the dome 56, so that the skirts 58, 60—(in particular the inner skirt 58)—are disposed radially outside the dome; this allows the dome to be freely compressed for dispensing, as is later to be described.

The pump member 54 is assembled to the body 10 by sliding the skirts down over the projection 36, with inner skirt 58 abutting the inner wall 38 of the projection 36, with outer skirt 60 lightly stretched elastically around the outer wall 40 of the projection, and with its rounded portion 62 in close conformity with the top wall 42 of the projection. The bifurcated skirt of the pump member 54 thus separately closes both the aperture 20 and the discontinuity 44 of the projection 36, whilst the well 50 communicates the pump chamber 21 with the discontinuity 44 beneath the inner skirt 58.

A moulded plastics cover 64 is snap-engaged permanently on to the body 10 and retained there by a peripheral bead 66. It encloses the pump member 54 so as substantially to prevent inadvertent operation of the dispenser, and provides an upstanding hollow spout 68 through which product may leave the dispenser for deposition on to, for examle, a toothbrush. For that purpose the bottom, proximal end of the spout 68 is located over the outside of the outer skirt 60 at the discontinuity 44, as is indicated by the broken line in FIG. 2. A part 61 of the spout engages the exterior of the rounded portion 60 so as to control the flow of product past the skirt 60, said part holding the skirt 60 against the projection 36 at either side of the discontinuity 44 forming what may be considered as the exit port of the pump chamber.

Although the elasticity of the outer skirt 60, together with the engagement by the actuator 70 and by the portion 61 of the spout 68, may be sufficient to retain the pump member 54 satisfactorily on the projection 36, for additional security axially extending, radially projecting ribs 65—two of which are shown—are moulded on the inside surface of the cover 64 so as with their free edges to engage the exterior of the outer skirt 60 and to pinch the skirt against the underlying outer wall 40 of the projection.

The dispenser is arranged to be operated by finger pressure of the user, and accordingly has a moulded plastics piston actuator 70 held captive for vertical sliding movement by the cover 64, with its rounded lower end 72 in central engagement with the top of the dome 56 of the pump member 54, and with its upper end accessible to the user. By virtue of its natural resilience, the pump member biasses the actuator upwardly against an annular limit stop 74 which defines the retracted, non-operative position of the actuator as shown. For ease of moulding, the actuator is formed of upper and lower parts 76, 78 which are snap-engaged together and secured by a bead 79 on the upper part.

The dispenser is charged with product through the bottom end of the body 10 with the follower piston 14 absent. The piston 14 is then pushed into the body and up to the product, suitable means, e.g. longitudinally extending grooves 80 formed along the base 16 at the lower end of the body, being provided for venting the body of trapped air as the piston 14 is being inserted. If desired, one or more priming operations of the actuator may be performed at this stage.

For use, the consumer depresses the actuator 70 repeatedly as required, so as to dispense metered amounts of the product through the spout 68. On each downward stroke of the actuator the dome 56 of the pump member 54 is compressed, so pressurising product already in the pump chamber 21. Product is therefore forced from the pump chamber along the well 50 and into the discontinuity 44 of the projection 36; it then forces the outer skirt 60 of the pump member locally away from the shallow wall portion 40A of the sill 53, so enabling the product to pass over the sill and into the spout 68 for dispensing. During this time the inner skirt 58 closes the inlet aperture 20 against any escape of product back into the product reservoir, it being understood that the greater the pressure of product in the pump chamber the more firmly the inner skirt will be forced against the projection 36 to form the desired seal against product flow in the reverse direction. The boss 34 ensures a free passage for product to enter the well 50 around the whole periphery of the dispenser, by limiting the possible compression of the pump member by the user. If desired, for different applications, the height of the boss 34 may be varied to change the volume of product delivered by each operation of the dispenser.

After each dispensing stroke the user releases the actuator 70, whereupon the pump member 54 reverts resiliently to its original shape, thereby forcing the actuator upward to its retracted position shown and at the same time creating a subatmospheric pressure in the pump chamber. This reduced pressure creates a differential pressure across the inner skirt at the inlet aperture 20, so forcing the skirt to move locally away from the projection 36 in a radially inward direction, and allowing product to pass beneath the inner skirt and to enter the pump chamber from the product reservoir.

In this way the pump chamber is replenished with product from the product reservoir. Any substantial "suck-back" of product down the spout 68 during this time is prevented by sealing engagement of the outer skirt 60 with the wall portion 40A of the projection 36, although a small degree of suck-back may be desirable to prevent dribbling.

In known manner the piston 14 is forced by atmospheric pressure to move along the body so as to remain in full contact with the product as dispensing proceeds. If desired, a board or plastics disc 82 may be snap-engaged into the standing rim 12 as shown so as to prevent dust and other foreign matter from entering the body behind the piston.

In a possible modification of the dispenser shown in FIGS. 1, 2 the inner skirt 58 is reduced in height so as to terminate at a substantial distance above the plane of the annulus 48; the well 50 is then omitted.

Figure 3:
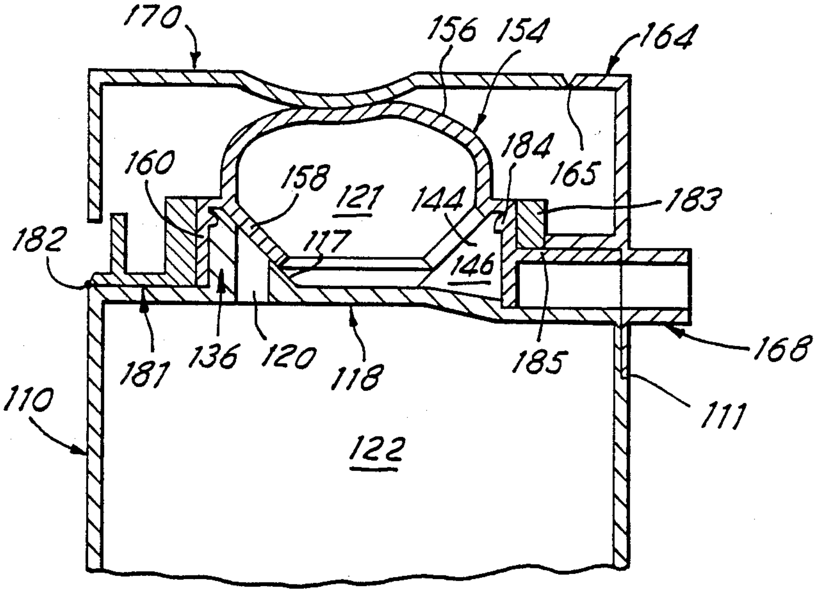
FIG. 3 is a view similar to FIG. 1 of a second pump chamber dispenser in accordance with the invention, showing the top part only of the dispenser.

The embodiment of the invention shown in FIG. 3 has many similarities to the embodiment of FIGS. 1 and 2, and the same reference numerals as before, prefixed with the numeral 1, are generally used to indicate like or equivalent parts.

In FIG. 3 the pump member 154 is again unitary and generally dome-shaped, and forms a pump chamber 121 with the closure panel 118 of the dispenser body 110 (only the top part of which is shown). As with the first embodiment, the pump member has a central dome 156 and a bifurcated peripheral skirt formed with inner and outer skirts 158, 160, the inner skirt being arranged to form an entry valve for the pump chamber and the outer skirt likewise being arranged to form an exit valve for the pump chamber.

The inner skirt 158 is frustoconical and is moulded to extend inwardly and downwardly in relation to the pump chamber 121. When the pump member is assembled to the body 110 as shown, the inner skirt lies against the frustoconical upper surface 117 of a solid, generally annular projection 136 moulded as part of the body closure panel 118.

The projection 136 is formed with a passage 120 leading to the entry port of the pump chamber 121 and accordingly arranged to communicate the pump chamber with the variable-volume reservoir 122 of the dispenser when the inner skirt is raised; to assist moulding the passage 120 is perpendicular to the closure panel 118 so as to be directed axially of the dispenser. Diametrically opposite the passage 120 the projection is formed with a discontinuity 144 by which product can leave the pump chamber via the exit valve formed by the outer skirt 160. The sides of the discontinuity are formed by spaced vertical faces 146 of which one can be seen in FIG. 3.

The pump member is enclosed by an upper cover 164 providing a dispensing spout 168 which projects horizontally from the side of the dispenser. The cover 164 is moulded integrally with the body 110 and attached by an integral hinge 111 which is located underneath the spout 168. It provides the actuator 170 for the dispenser and accordingly is articulated at a further integral hinge 165 formed across its top panel. The actuator portion 170 of the cover is biassed by the hinge 165 to lie against the underlying pump member 154, and for dispensing is depressed by the user so as to pivot downwardly about the hinge.

In addition to the upper cover 164, a lower cover part in the form of a security member 181 is moulded integrally with the body 110 and attached by a further integral hinge 182. The security member has a ring portion 183 which is sleeved over the outer skirt 160 of the pump member 154 to hold the pump member in position on the body with the assistance of a bead 184 on the outer skirt.

The formation of the cover 164 (including the actuator portion 170) and the security member 181 integrally with the body 110 avoids any requirement for those items to be orientated angularly in relation to one another before assembly. The cover, security member and body are moulded so as to be in an extended, generally horizontal, relation. For assembly the pump member is located on the projection 136 as shown, the security member is then swung into its required position from the left, and the cover 164 with the actuator portion 170 is subsequently swung into position from the right.

In contrast with the first embodiment, however, the pump member 154 does require orientation in relation to the body 110; it is rotationally assymmetrical, having a discontinuity in its inner skirt 158 corresponding to the discontinuity 144 of the projection 136, and having a flap 185 corresponding in angular position to this discontinuity on the outside of the pump member and arranged to prevent product from escaping into the cover 164 when on its way to the dispensing spout 168.

It will be understood from the foregoing that the pump member 54, 154 of each of the described embodiments provides not only for pumping product from the associated product reservoir to the dispensing spout of the dispenser, but it also provides flap valves by which the inlet and exit ports of the pump chambers are controlled. By suitable choice of the individual thicknesses of the pump member at its dome portion and at its inner and outer skirts, the ability of the pump member to perform the different functions required of it can be optimised, and the dispenser can be adapted for products having widely different flow characteristics. Moreover, the pump member is of simple shape and is correspondingly cheap to mould, and in the embodiment of FIG. 1 it is rotationally symmetrical and does not require angular orientation before assembly.

The pump member of a dispenser according to the invention may have configurations other than the particular configurations shown and described for the members 54, 154. Preferably, as in the embodiment of FIGS. 1 and 2, the pump member is rotationally symmetrical so as not to require orientation for assembly.

What is claimed is:

1. In a pump chamber dispenser for viscous or pasty product, comprising a body including a tubular side wall and an end wall panel integral with the side wall, a closed reservoir chamber within the body for receiving viscous or pasty product to be dispensed, the chamber being defined partly by said end wall panel, displacement means within the chamber to move the viscous or pasty product toward said end wall panel, and a unitary pumping member of elastomeric material mounted on the end wall panel outside of the reservoir chamber and confining with the end wall panel a variable volume pump chamber, the pumping member including integral inlet and exit valve elements, an inlet port for conducting product to the pumping chamber from the reservoir chamber and an exit port for conducting product from the pumping chamber to a discharge nozzle, the inlet and exit ports being controlled by the inlet and exit valve elements, respectively, the improvement wherein:

said end wall panel has a substantially annular projection directed away from the reservoir chamber and extending around an axis substantially parallel to the longitudinal axis of the body;

said pumping member has a domed portion and inner and outer coaxial skirts extending from the edge of the domed portion and forming said inlet and exit valve elements, respectively, said skirts lying against radially inner and outer surfaces of said projection;

said inlet port extends through said radially inner surface of the projection and is closable by the inner skirt;

a passage is formed within the projection, and communicates said inlet port with said reservoir chamber, wherein said passage is defined by a substantially annular groove formed in the projection and open to the reservoir chamber along its substantially annular extent;

a recess provided in said end wall panel extends across the projection and defines said exit port, the exit port being in communication with the pumping chamber and opening at the said radially outer surface of the projection at a position to be closable by the outer skirt; and a cover member is attached to the body and defines said discharge nozzle, the cover member being arranged to enclose the pumping member and having a movable part for acting on the domed portion of the pumping member to reduce the volume of the pumping chamber for dispensing.

2. A pump chamber dispenser according to claim 1, wherein the inner skirt extends continuously between the pumping chamber and exit port but the exit port communicates with the pumping chamber at a level beyond the free edge of the inner skirt.

3. A pump chamber dispenser according to claim 2, wherein the inner and outer skirts are peripherally continuous and the pumping member is rotationally symmetrical about an axis substantially parallel to the longitudinal axis of the body.

4. A pump chamber dispenser according to claim 1, wherein each skirt is non-convergent towards the free edge thereof.

5. A pump chamber dispenser according to claim 4, wherein the skirts are substantially parallel to the longitudinal axis of the body.

6. A pump chamber dispenser according to claim 1, wherein said displacement means is a piston follower.

7. A pump chamber dispenser according to claim 1, wherein said cover member presses said outer skirt into sealing abutment with said radially outer surface of the projection at either side of said exit port.

8. A pump chamber dispenser according to claim 1, wherein the cover member has a snap fit attachment to the body.

9. A pump chamber dispenser according to claim 1, wherein the cover member is integral with the body and attached thereto by an internal hinge.

10. A pump chamber dispenser for viscous or pasty product, comprising a body including a tubular side wall and an end wall panel integral with the side wall, a closed reservoir chamber within the body for receiving viscous or pasty product to be dispensed, the chamber being defined partly by said end wall panel, a piston within the chamber to move the viscous or pasty product toward said end wall panel, a unitary pumping member of elastomeric material mounted on the end wall panel outside of the reservoir chamber and confining with the end wall panel a variable volume pump chamber, the pumping member including integral inlet and exit valve elements, an inlet port for conducting product to the pumping chamber from the reservoir chamber and an exit port for conducting product from the pumping chamber to a discharge nozzle, the inlet and exit ports being controlled by the inlet and exit valve elements, respectively, said end wall panel having a substantially annular projection directed away from the reservoir chamber and extending around an axis substantially parallel to the longitudinal axis of the body, the projection having inner and outer substantially cylindrical surfaces, and said pumping member being rotationally symmetrical about an axis substantially parallel to the longitudinal axis of the body and having a domed portion and inner and outer coaxial skirts extending from the edge of the domed portion and forming said inlet and exit valve elements, respectively, said skirts lying against said radially inner and outer surfaces of said projection, a substantially annular groove formed in said projection and open to said reservoir chamber along its substantially annular extent, said inlet port extending through the end wall panel from said groove to said radially inner surface of the projection, and said inlet port being closable by the inner skirt, a recess provided in said end wall panel and extending across the projection to define said exit port, the exit port communicating with the pumping chamber and opening at the said radially outer surface of the projection at a position to be closable by the outer skirt, and a cover member fixed to the body by a snap connection and including said discharge nozzle, the cover member having a movable part for acting on the domed portion of the pumping member to reduce the volume of the pumping chamber, and being arranged to enclose the pumping member during operation of the pump dispenser.

11. A pump chamber dispenser for a viscous or pasty product comprising:

- a tubular body;
- an end wall panel integral with said tubular body to define partly a closed reservoir chamber for viscous or pasty product to be dispensed, wherein said end wall panel comprises:
  - a substantially annular projection defined by inner and outer surfaces directed away from the reservoir chamber and extending around an axis substantially parallel to the longitudinal axis of the body;
  - an inlet port extending through the inner surface of the projection; and
  - an exit port in said end wall panel associated with said projection;
- displacement means within the chamber to move the viscous or pasty product toward said end wall panel;
- a pump member of elastomeric material mounted on the end wall panel outside the reservoir chamber, said end wall panel and said pumping member defining a variable volume pump chamber, wherein said pumping member comprises:
  - a domed-shaped portion;
  - an outer skirt extending from the dome-shaped portion over the outer surface of the projection and against the exit port; and
  - valve means extending downwardly from the dome-shaped portion over at least part of the inner surface of the projection and against the inlet port;
- a passage connecting the inlet port and the reservoir chamber, wherein said passage is defined by a substantially annular groove formed in the projection and open to the reservoir chamber along its substantially annular extent, whereby release of the dome-shaped portion from a depressed state advances said displacement means toward said end wall and conveys viscous or pasty material from the reservoir chamber through said passage and the inlet port, past the valve means, and into the pump chamber; and
- a recess extending across the projection to define the exit port and connecting the pump chamber and a discharge nozzle, whereby depression of the dome-shaped portion of said pumping member pushes viscous or pasty material from the pump chamber through said recess and outlet port, past the outer skirt, and out of said discharge nozzle.

12. A pump chamber dispenser according to claim 11, wherein the valve means comprises:

- an inner skirt extending downwardly from the dome-shaped portion radially inwardly of the outer skirt.

13. A pump chamber dispenser according to claim 12, wherein the inner skirt extends continuously between the pumping chamber and exit port but the exit port communicates with the pumping chamber at a level below inner skirt.

14. A pump chamber dispenser according to claim 13, wherein the inner and outer skirts are peripherally continuous, and the pumping member is rotationally symmetrical about an axis substantially parallel to the longitudinal axis of the body.

15. A pump chamber dispenser according to claim 12, wherein each skirt extends from the dome-shaped portion non-convergently and substantially parallel to the longitudinal axis of the body.

16. A pump chamber dispenser according to claim 11, wherein said displacement means is a piston follower.

17. A pump chamber dispenser according to claim 11 further comprising:

- a cover member attached to the body and defining said discharge nozzle, the cover member being arranged to enclose the pumping member and having a movable part for acting on the domed portion to reduce the volume of the pumping chamber and to effect dispensing.

18. A pump chamber dispenser according to claim 17, wherein the cover member is integral with and attached to said tubular body with an integral hinge.

* * * * *